(12) United States Patent
Iwata

(10) Patent No.: US 12,516,721 B2
(45) Date of Patent: Jan. 6, 2026

(54) GEAR STRUCTURE AND GEAR MECHANISM

(71) Applicant: NOK CORPORATION, Tokyo (JP)

(72) Inventor: Naoya Iwata, Tottori (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/775,308

(22) Filed: Jul. 17, 2024

(65) Prior Publication Data

US 2025/0035201 A1     Jan. 30, 2025

(30) Foreign Application Priority Data

Jul. 27, 2023    (JP) ................................. 2023-122105

(51) Int. Cl.
     *F16H 55/18*        (2006.01)

(52) U.S. Cl.
     CPC .................... *F16H 55/18* (2013.01)

(58) Field of Classification Search
     CPC ...... F16H 55/14; F16H 55/18; F16H 57/0006; F16F 15/124; F16F 15/126
     See application file for complete search history.

(56) References Cited

U.S. PATENT DOCUMENTS

| 5,400,672 A | * | 3/1995 | Bunch, Jr. | ............... F16H 55/14 |
| | | | | 74/461 |
| 10,352,426 B2 | * | 7/2019 | Kobayashi | ............... F16H 55/18 |
| 2014/0190442 A1 | | 7/2014 | Saito et al. | |

FOREIGN PATENT DOCUMENTS

| DE | 4426325 B4 | * | 7/2004 | ............ F16H 55/14 |
| EP | 1180617 A1 | * | 2/2002 | ............ F16H 55/14 |
| JP | H06193714 A | * | 7/1994 | ............ F16H 7/0006 |
| JP | 11230313 A | * | 8/1999 | |
| JP | 2014-134230 A | | 7/2014 | |
| JP | 6403582 B2 | * | 10/2018 | |

OTHER PUBLICATIONS

Shuman, RB et al., Noise Reducing Gear, Jul. 1, 1977, ip.com (Year: 1977).*

* cited by examiner

*Primary Examiner* — Bobby Rushing, Jr.
(74) *Attorney, Agent, or Firm* — Harness, Dickey & Pierce, P.L.C.

(57) ABSTRACT

A gear structure includes a gear member including an outer circumferential surface provided with a plurality of gear teeth, and a band member surrounding the gear member and pressing the plurality of gear teeth inwardly.

6 Claims, 7 Drawing Sheets

FIG. 6

| | Ød [mm] | W [mm] | Hs | MEASUREMENTS | EFFECT |
|---|---|---|---|---|---|
| COMPARATIVE EXAMPLE | — | — | — | 60dB | — |
| FIRST EXAMPLE | 85 | 5.7 | 70 | 35dB | -25dB |
| SECOND EXAMPLE | 90 | 5.7 | 70 | 33dB | -27dB |
| THIRD EXAMPLE | 90 | 5.7 | 90 | 38dB | -22dB |
| FOURTH EXAMPLE | 90 | 3.1 | 70 | 40dB | -20dB |

GEAR STRUCTURE AND GEAR MECHANISM

CROSS REFERENCE TO RELATED APPLICATION

This application is based on, and claims priority from, Japanese Patent Application No. 2023-122105, filed on Jul. 27, 2023, the entire contents of which are incorporated herein by reference.

BACKGROUND

Technical Field

This disclosure relates to gear structures.

Related Art

For example, a drive mechanism mounted in a mobile object such as an automobile may have a disadvantage of emitting gear noise such as gear rattling noise caused by impact of gear teeth of a plurality of gears, and gear meshing noise caused by deformation of gear teeth. Japanese Patent Application Laid-Open Publication No. 2014-134230 discloses a configuration in which a gear includes two annular grooves that each accommodate an annular elastic body for absorbing vibrations. One of the two annular grooves is formed on a surface of the gear in an axial direction, and the other of the two annular grooves is formed on a surface of the gear in a direction opposite to the axial direction. However, in the configuration disclosed in Japanese Patent Application Laid-Open Publication No. 2014-134230, since an annular groove is formed on a surface of the gear, a degree of rigidity of the gear is reduced. As a result, there is a disadvantage of reduced reliability of torque transmission.

SUMMARY

An object of one aspect according to this disclosure is to maintain a degree of rigidity of a gear member and to reduce gear noise.

A gear structure according to one aspect of this disclosure includes a gear member including an outer circumferential surface provided with a plurality of gear teeth, and a band member surrounding the gear member and pressing the plurality of gear teeth inwardly.

A gear mechanism according to another aspect of this disclosure includes a first gear structure, and a second gear structure that meshes with the first gear structure, in which the first gear structure includes a first gear member including an outer circumferential surface provided with a plurality of first gear teeth; and a first band member surrounding the first gear member and pressing the plurality of first gear teeth inwardly.

BRIEF DESCRIPTION OF THE DRAWINGS

FIG. 6 is a table showing measurements of operating sounds emitted by gear mechanisms.

DETAILED DESCRIPTION

An embodiment according to this disclosure will now be described with reference to the accompanying drawings. In each drawing, dimensions and scales of elements may differ from those of actual products. In addition, the embodiment described below is an exemplary embodiment assumed in a case in which this disclosure is implemented. Thus, the scope of this disclosure is not limited to the embodiment described below.

A: Gear Structure 10

Figure 1:
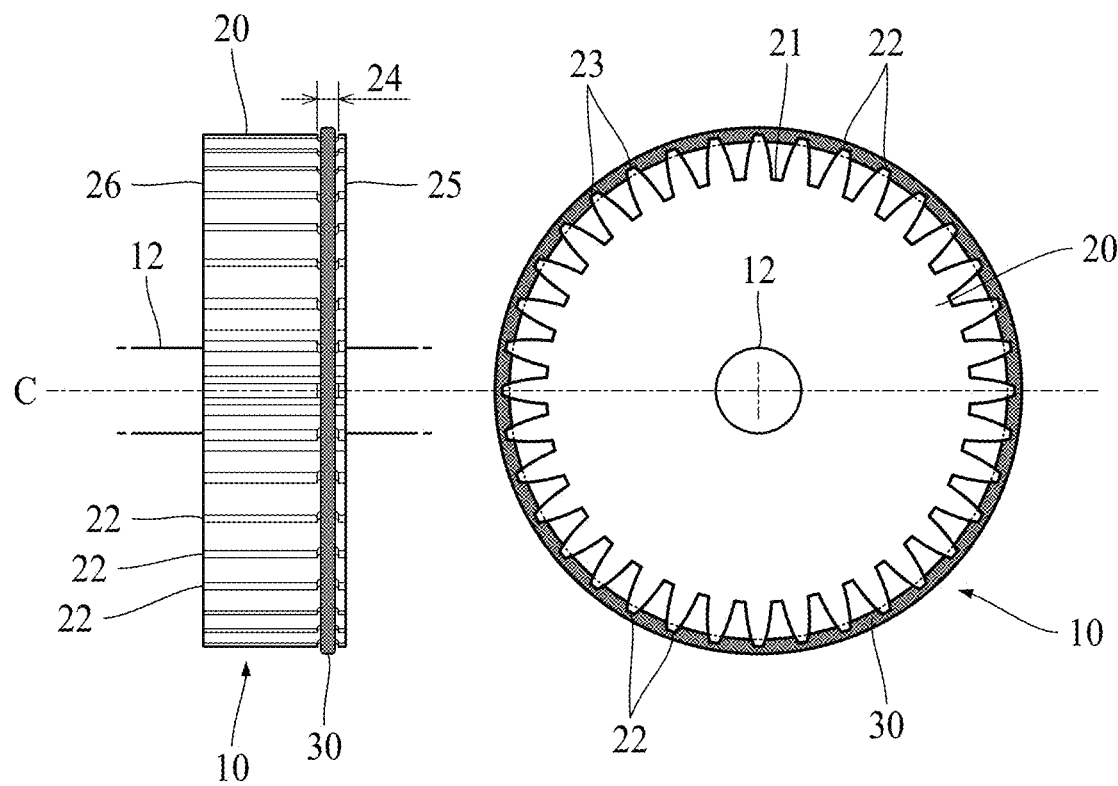
FIG. 1 shows a front view of, and a side view of, a gear structure according to an embodiment.

FIG. 1 shows a front view of, and a side view of, a gear structure 10 according to an aspect of this disclosure. The gear structure 10 is a rotatable body fixed to a shaft member 12. The shaft member 12 is a rotatable cylindrical shaft around a rotation axis C. The shaft member 12 can be understood to be an element of the gear structure 10.

In the following description, a virtual circle is assumed that has a freely selected diameter and a center disposed at the rotation axis C. A direction of a circumference of the virtual circle is denoted as a "circumferential direction," and a direction of a radius of the virtual circle is denoted as a "radial direction." A direction, which is along the radial direction and toward the rotation axis C, is denoted as an "inward direction." A direction, which is along the radial direction and away from the rotation axis C, is denoted as an "outward direction."

As shown in FIG. 1, the gear structure 10 includes a gear member 20 and a band member 30. The gear member 20 is a disc-shaped spur gear. The gear member 20 includes an outer circumferential surface 21 provided with a plurality of gear teeth 22 that are equally spaced apart from one another in the circumferential direction.

The band member 30 is an elastic body surrounding the gear member 20. Specifically, the band member 30 is an annular elastic body surrounding an entire circumference of the gear member 20. In other words, the band member 30 has a shape of a ring along the outer circumferential surface 21 and faces the outer circumferential surface 21. The band member 30 is, for example, an O-ring that is circular as viewed in cross section. The band member 30 is integrally formed of one or more types of rubber materials, for example.

The band member 30 is fixed to the gear member 20 by interference. Thus, the gear member 20 is provided with the band member 30 that is elastically expanded such that a diameter of the band member 30 that is provided is greater than a diameter of the band member 30 that is not provided. As a result, the band member 30 maintains predetermined compressing force and is provided in the gear member 20; therefore, the band member 30 presses the plurality of gear teeth 22 inwardly.

Figure 2:
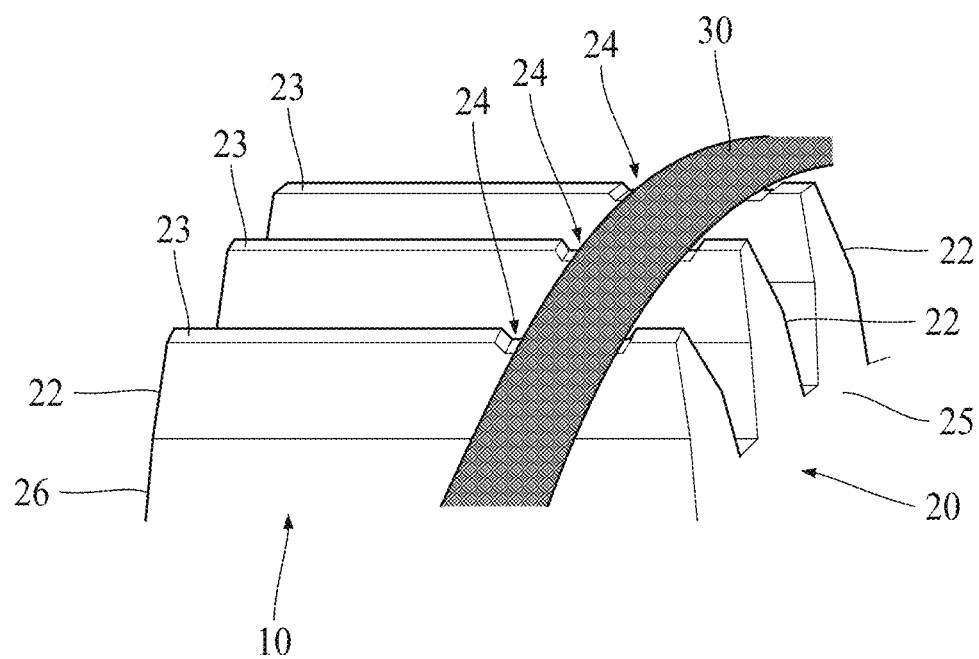
FIG. 2 is an enlarged perspective view of a part of the gear structure.
Figure 3:
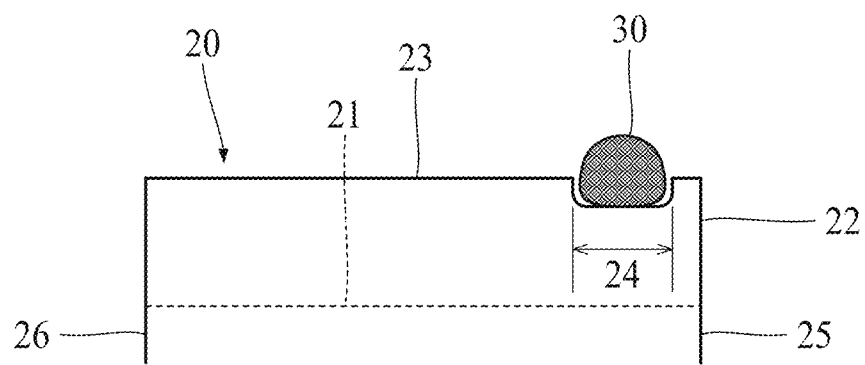
FIG. 3 is a front view of a gear tooth.

FIG. 2 is an enlarged perspective view of a part of the gear structure 10. FIG. 3 is a front view of a gear tooth 22 among the plurality of gear teeth 22. As shown in FIG. 2 and FIG. 3, each of the plurality of gear teeth 22 includes a tip surface 23 that is provided with a mounting groove 24. The mounting groove 24 is a recess that is recessed from the tip surface 23 of each of the plurality of gear teeth 22. Each of the plurality of gear teeth 22 has a first portion provided with the mounting groove 24. In a direction along the rotation axis C (in other words, in a direction of width of the gear member 20), locations of first portions of the plurality of gear teeth 22 are the same as the others.

As shown in FIG. 1 to FIG. 3, the gear member 20 includes a side surface 25 and a side surface 26. The side surface 25 faces in the direction along the rotation axis C, and the side surface 26 faces in a direction opposite to the direction along the rotation axis C. As shown in FIG. 1 to FIG. 3, in the direction along the rotation axis C, the mounting groove 24 is closer to the side surface 25 than to the side surface 26. Specifically, the mounting groove 24 is interposed between the side surface 25 and a middle of the gear member 20 in the direction along the rotation axis C.

As shown in FIG. 2 and FIG. 3, the band member 30 fits in the mounting groove 24 provided in each of the plurality of gear teeth 22. Specifically, the band member 30 surrounds the gear member 20 in a state in which the band member 30 is in contact with a bottom surface of the mounting groove 24 provided in each of the plurality of gear teeth 22. Thus, in the direction along the rotation axis C, the band member 30 is disposed at a location closer to the side surface 25 than to the side surface 26. As shown in FIG. 3, the band member 30 protrudes outwardly from a level of the tip surface 23 of each of the plurality of gear teeth 22. As described above, in this embodiment, the band member 30 fits in the mounting groove 24 of each of the plurality of gear teeth 22. Thus, compared to a configuration in which the mounting groove 24 is not provided, it is possible to reduce probability of detachment of the band member 30 from the gear member 20, for example.

B: Gear Mechanism 100

Figure 4:
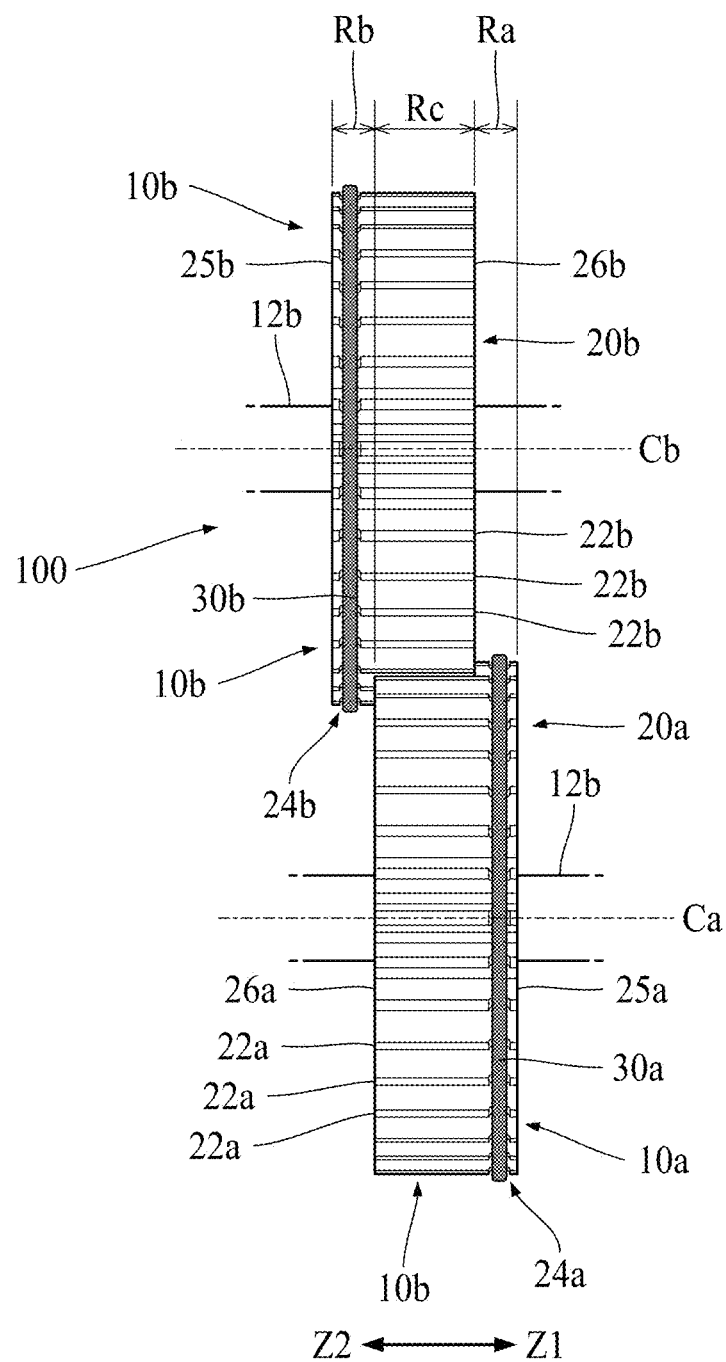
FIG. 4 is a front view of a gear mechanism according to this embodiment.

FIG. 4 is a front view of a gear mechanism 100 including the gear structure 10 described above. As shown in FIG. 4, the gear mechanism 100 includes a gear structure 10a and a gear structure 10b that meshes with the gear structure 10a. Each of the gear structure 10a and the gear structure 10b has the same configuration as the gear structure 10 shown in FIG. 1 to FIG. 3. An "a" is appended to each element of the gear structure 10a, and a "b" is appended to each element of the gear structure 10b.

Specifically, the gear structure 10a includes a gear member 20a including an outer circumferential surface 21a provided with a plurality of gear teeth 22a, and a band member 30a surrounding the gear member 20a and pressing the plurality of gear teeth 22a inwardly. The gear structure 10a is an example of a "first gear structure," the gear member 20a is an example of a "first gear member," the plurality of gear teeth 22a is an example of a "plurality of first gear teeth," and the band member 30a is an example of a "first band member."

Similarly, the gear structure 10b includes a gear member 20b including an outer circumferential surface 21b provided with a plurality of gear teeth 22b, and a band member 30b surrounding the gear member 20b and pressing the plurality of gear teeth 22b inwardly. The gear structure 10b is an example of a "second gear structure," the gear member 20b is an example of a "second gear member," the plurality of gear teeth 22b is an example of a "plurality of second gear teeth", and the band member 30b is an example of a "second band member."

A rotation axis Ca of the gear structure 10a, and a rotation axis Cb of the gear structure 10b, extend parallel to each other so as to be spaced apart from each other. In FIG. 4, a direction Z1 and a direction Z2 are shown that are parallel to a rotation axis C that is either of the rotation axis Ca and the rotation axis Cb. The direction Z1 and the direction Z2 are opposite to each other. The gear structure 10a is disposed such that a side surface 25a of the gear member 20a faces in the direction Z1. On the other hand, the gear structure 10b is disposed such that a side surface 25b of the gear member 20b faces in the direction Z2. In other words, the side surface 25a of the gear structure 10a and the side surface 25b of the gear structure 10b face away from each other.

In a direction along the rotation axis C, a location of the gear structure 10a is different from a location of the gear structure 10b. Specifically, in the direction along the rotation axis C, the location of the gear structure 10a is shifted in the direction Z1 from the location of the gear structure 10b. A range Rc extending in the direction along the rotation axis C is a range within which the gear structure 10a and the gear structure 10b overlap one over the other.

In the direction along the rotation axis C, the side surface 25a of the gear structure 10a is disposed in the direction Z1 from a side surface 26b of the gear structure 10b. Within a range Ra shown in FIG. 4, a portion of the gear structure 10a extending in the direction along the rotation axis C is disposed. Within the range Ra, the portion of the gear structure 10a does not overlap the gear structure 10b. In other words, the range Ra is interposed between the side surface 25a of the gear structure 10a and the side surface 26b of the gear structure 10b. Thus, the range Ra is disposed in the direction Z1 from the range Rc. The band member 30a of the gear structure 10a is disposed within the range Ra. In other words, within the range Ra extending in the direction along the rotation axis C, the band member 30a does not overlap the gear structure 10b.

In the direction along the rotation axis C, the side surface 25b of the gear structure 10b is disposed in the direction Z2 from the side surface 26a of the gear structure 10a. Within a range Rb shown in FIG. 4, a portion of the gear structure 10b extending in the direction along the rotation axis C is disposed. Within the range Rb, the portion of the gear structure 10b does not overlap the gear structure 10a. In other words, the range Rb is interposed between the side surface 25b of the gear structure 10b and the side surface 26a of the gear structure 10a. Thus, the range Rb is disposed in the direction Z2 from the range Rc. The band member 30b of the gear structure 10b is disposed within the range Rb. In other words, within the range Rb extending in the direction along the rotation axis C, the band member 30b does not overlap the gear structure 10a.

Figure 5:
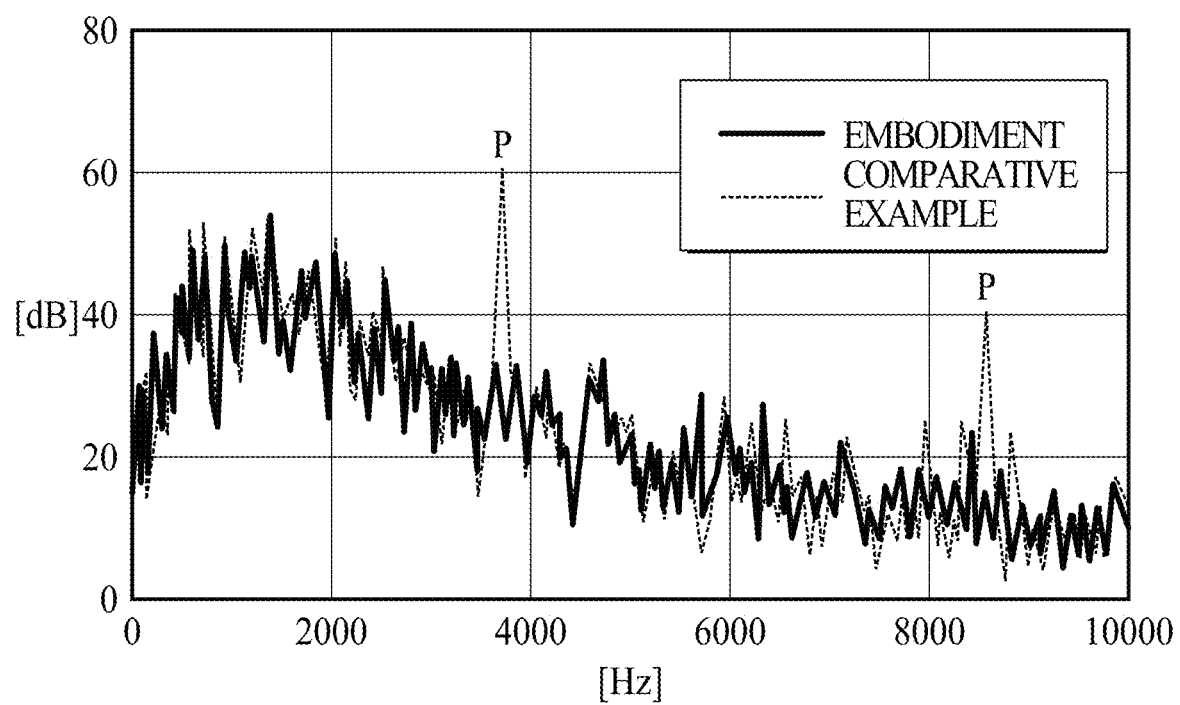
FIG. 5 is a diagram showing frequency characteristics of operating sounds emitted by the gear mechanism.

FIG. 5 is a diagram showing frequency characteristics of operating sounds caused by operation of the gear mechanism 100. FIG. 5 shows the frequency characteristics of the operating sounds caused by operation of this embodiment in which the band member 30a and the band member 30b are provided. Furthermore, FIG. 5 shows the frequency characteristics of the operating sounds caused by operation of a configuration (hereinafter referred to as a "comparative example") in which neither the band member 30a nor the band member 30b is provided.

In general, a gear mechanism in which a plurality of gears mesh with one another emits gear noise such as gear rattling noise or gear meshing noise. The gear rattling noise is caused by impact of gear teeth of the plurality of gears. The gear meshing noise is caused by deformation of the gear teeth due to force applied to the gear teeth. As shown in FIG.

5, in the comparative example, local peaks P caused by a natural frequency of the gear member 20 are detected from operating sounds.

In contrast to the comparative example, in this embodiment, the band member 30 pressing the gear member 20 inwardly is provided. Thus, local peaks P of operating sounds are significantly reduced. It is assumed that vibrations of each of the plurality of gear teeth 22 are reduced by the band member 30 pressing the gear member 20 inwardly or by friction between the band member 30 and the plurality of gear teeth 22. It is assumed that the reduction in the vibrations of each of the plurality of gear teeth 22 causes the reduction in gear noise described above.

FIG. 6 is a table showing measurements of operating sounds emitted by a gear mechanism 100 for each example of a plurality of examples including a first example to a fourth example. Gear structures 10 in the plurality of examples are different in element size from one another. The plurality of examples are different from one another in combination of (1) an inner diameter Ød of a band member 30, (2) a wire diameter W of the band member 30, and (3) hardness Hs of the band member 30. In FIG. 6, a measurement of sound pressure of operating sounds in the comparative example, a measurement of sound pressure of operating sounds in each of the plurality of examples, and a difference (effect) between a measurement in the comparative example and a measurement in each of the plurality of examples are shown. A diameter (tip diameter) of a gear member 20 in the comparative example and a diameter (tip diameter) of a gear member 20 in each of the plurality of examples are each 94 mm. With an increase in the inner diameter Ød of a band member 30, the interference is reduced.

As will be understood from FIG. 6, the effect of reducing operating sounds is maximized in the second example. As will be understood from comparison of the first example and the second example, with a decrease in the interference of the band member 30 (in other words, with an increase in the inner diameter Ød of the band member 30), gear noise with operating sounds is reduced. As will be understood from comparison of the second example and the third example, with a decrease in the hardness Hs of the band member 30 (in other words, with an increase in flexibility of the band member 30), gear noise with operating sounds is reduced. As will be understood from comparison of the second example and the fourth example, with an increase in the wire diameter W of the band member 30, gear noise with operating sounds is reduced.

As will be understood from the above description, a configuration in which the interference of the band member 30 is small, the hardness Hs of the band member 30 is low, and the wire diameter W of the band member 30 is large has an advantage of gear noise reduction. A degree of gear noise reduction caused by the wire diameter W of the band member 30 is greater than that caused by the hardness Hs of the band member 30. The degree of gear noise reduction caused by the hardness Hs of the band member 30 is greater than that caused by the interference of the band member 30.

As described above, in this embodiment, the band member 30 surrounds the gear member 20 to press the plurality of gear teeth 22 inwardly. Thus, it is possible to maintain a degree of rigidity of the gear member 20 and to reduce gear noise. In this embodiment, the band member 30 particularly surrounds the entire circumference of the gear member 20. Thus, the effect is particularly significant in that gear noise is reduced.

The range Ra extends in the direction along the rotation axis C. The band member 30*a* is disposed within the range Ra within which the gear structure 10*a* and the gear structure 10*b* do not overlap one over the other. In other words, the band member 30*a* does not interfere with the gear structure 10*b*. Thus, gear noise can be reduced in a state in which the band member 30*a* does not affect rotation of the gear structure 10*b*. Similarly, the range Rb extends in the direction along the rotation axis C. The band member 30*b* is disposed within the range Rb within which the gear structure 10*a* and the gear structure 10*b* do not overlap one over the other. Thus, gear noise can be reduced in a state in which the band member 30*b* does not affect rotation of the gear structure 10*a*.

C: Modifications

Specific modifications that may be applied to the above-described embodiment are described below. Two or more modifications freely selected from the following modifications may be combined as long as no conflict arises from such combination.

(1) In the above-described embodiment, a configuration is described in which each of the plurality of gear teeth 22 is provided with the mounting groove 24. However, the mounting groove 24 may be omitted. In other words, the tip surface 23 of each of the plurality of gear teeth 22 may be a flat surface provided with no unevenness in a width direction of the gear member 20.

(2) In the above-described embodiment, a configuration is described in which the band member 30 is made of a rubber material. However, the band member 30 may be made of one or more types of resin materials. To reduce gear noise, the band member 30 is preferably made of a rubber material rather than made of a resin material.

(3) A shape of the band member 30 is not limited to the above example. For example, in the above-described embodiment, the band member 30 is an O-ring that is circular as viewed in cross section; however, the band member 30 may be an X-ring that has an X-shaped cross section or may be a D-ring that has a D-shaped cross section.

Figure 7:
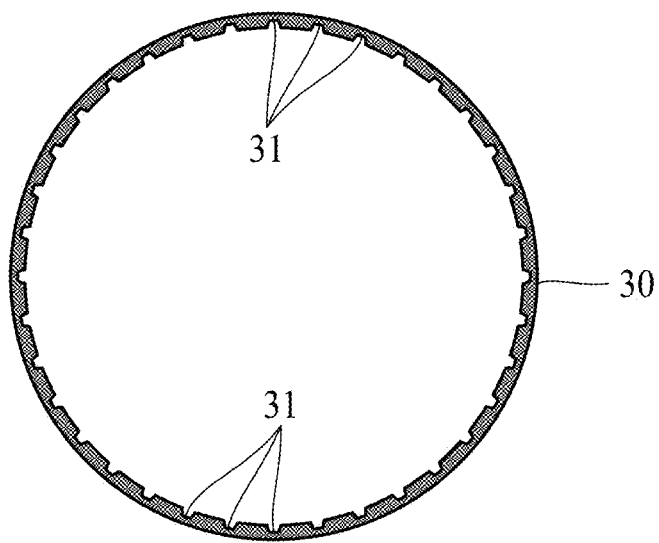
FIG. 7 is a plan view of a band member according to a modification.

(4) A planar shape of the band member 30 may be freely selected and is not limited to the above example. For example, as shown in FIG. 7, a band member 30 is assumed that has an inner circumferential surface provided with recesses 31 that each have a shape dependent on a shape of a distal end of a corresponding gear tooth 22 among the plurality of gear teeth 22. Each of the plurality of gear teeth 22 of the gear member 20 is fitted in a corresponding recess 31 among the recesses 31 shown in FIG. 7. Thus, in a configuration in which the band member 30 shown in FIG. 7 is included, the mounting groove 24 may be omitted as described above.

In the above-described embodiment, the band member 30 is annular. However, a planar shape of the band member 30 is not limited to an annular shape as long as the band member 30 can press the gear member 20 inwardly. For example, the planar shape of the band member 30 may be an arcuate shape (C-shaped) obtained by removing a portion of a ring from the ring.

(5) In the above-described embodiment, a configuration is described in which the band member 30 is separate from the gear member 20 and the band member 30 is attached to the gear member 20. However, a configuration and a method for providing the gear member 20 with the band member 30 are limited thereto. For example, liquid resin material may be applied to the outer circumferential surface 21 of the gear member 20, and the liquid resin material may be cured to form the band member 30 surrounding the gear member 20.

Figure 8:
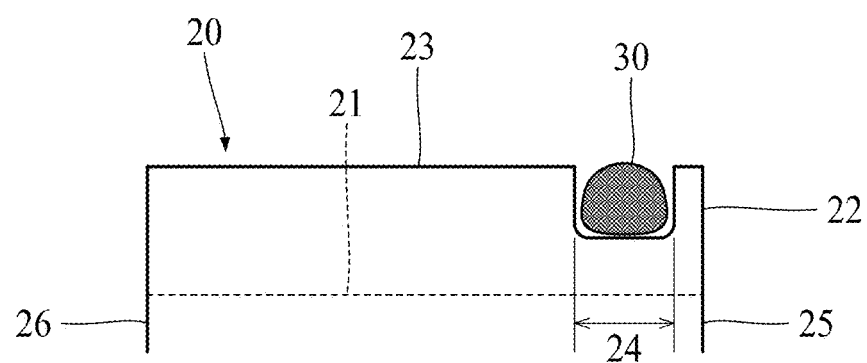
FIG. 8 is a front view of a gear tooth according to another modification.

(6) In the above-described embodiment, a configuration is described in which the band member 30 protrudes outwardly from the level of the tip surface 23 of each of the plurality of gear teeth 22. However, as shown in FIG. 8, a configuration is assumed in which an outer circumferential surface of the band member 30 is in a curved plane in which the tip surface 23 of each of the plurality of gear teeth 22 exists. Alternatively, a configuration is assumed in which a level of the outer circumferential surface of the band member 30 is lower than the level of the tip surface 23 of each of the plurality of gear teeth 22.

(7) In the above-described embodiment, a configuration is described in which the gear structure 10a and the gear structure 10b included in the gear mechanism 100 have the same configuration as each other. However, the gear structure 10a and the gear structure 10b may differ in shape or in size. For example, the gear member 20a and the gear member 20b may differ in diameter or in width.

(8) In the above-described embodiment, a configuration is described in which each of the gear structure 10a and the gear structure 10b includes the band member 30 (30a, 30b). However, a configuration is assumed in which either the gear structure 10a or the gear structure 10b includes the band member 30. However, to reduce gear noise effectively, a configuration may be preferable in which each of the gear structure 10a and the gear structure 10b includes the band member 30 (30a, 30b).

Figure 9:
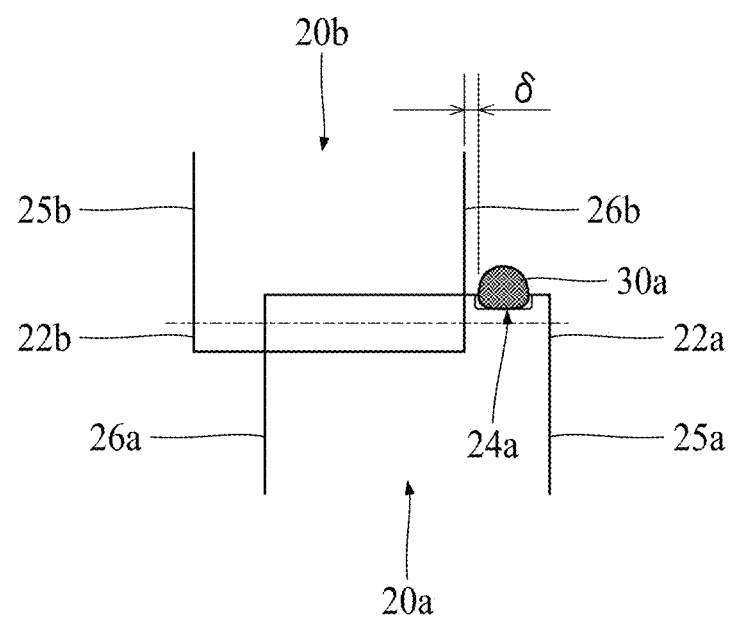
FIG. 9 is an explanatory diagram showing operation of yet another modification.

(9) FIG. 9 is an enlarged front view of a part of the gear mechanism 100 in which the gear structure 10a and the gear structure 10b mesh with each other. In FIG. 9, a gap δ between the band member 30a of the gear structure 10a and the side surface 26b of the gear member 20b is shown. The part of the gear mechanism 100 in which the gear structure 10a and the gear structure 10b mesh with each other is supplied or filled with lubricant.

In a configuration in which the gap δ is sufficiently small, for example, torque applied to the gear structure 10b may be transmitted to the gear structure 10a via the lubricant. Specifically, shearing stress transmitted by the gear structure 10b to the lubricant is transmitted to the gear structure 10a. Thus, compared to a configuration in which the gap δ is too large to transmit the shearing stress, it is possible to reduce a rotation velocity difference between the gear structure 10a and the gear structure 10b. According to the above-described configuration, it is possible to reduce gear noise caused by impact of the plurality of gear teeth 22a of the gear structure 10a and the plurality of gear teeth 22b of the gear structure 10b.

In the above description, the gap δ between the band member 30a of the gear structure 10a and the side surface 26b of the gear member 20b is described. To reduce the rotation velocity difference, it is desirable that a gap δ between the band member 30b of the gear structure 10b and the side surface 26a of the gear member 20a be small.

(10) The notation "n-th" (n is a natural number) is used in this disclosure for convenience and is merely formality label to distinguish different elements from each other, and this notation has no substantive inherent meaning. Thus, notation of a position of an element or an order of production of an element as "n-th" is not limited to a narrow literal interpretation, and a position and an order of an element and the like are to be broadly understood.

D: Supplemental Notes

The following configurations are derivable from the foregoing embodiments.

A gear structure according to one aspect (first aspect) of this disclosure includes a gear member including an outer circumferential surface provided with a plurality of gear teeth; and a band member surrounding the gear member and pressing the plurality of gear teeth inwardly. According to this aspect, the band member surrounds the gear member to press the plurality of gear teeth inwardly. Thus, it is possible to maintain a degree of rigidity of the gear member and to reduce gear noise.

In a specific example (second aspect) of the first aspect, each of the plurality of gear teeth includes a tip surface provided with a mounting groove, and the band member fits in the mounting groove provided in each of the plurality of gear teeth. According to this aspect, the band member fits in the mounting groove provided in each of the plurality of gear teeth. Thus, it is possible to reduce probability of detachment of the band member from the gear member.

In a specific example (third aspect) of the first aspect or the second aspect, the band member is an annular elastic body. According to this aspect, the band member surrounds an entire circumference of the gear member. Thus, compared to a configuration in which the band member has an arcuate shape (C-shaped) obtained by removing a portion of a ring from the ring, the effect is particularly significant in that gear noise is reduced.

A gear mechanism according to another aspect (fourth aspect) of this disclosure includes a first gear structure; and a second gear structure that meshes with the first gear structure, in which the first gear structure includes a first gear member including an outer circumferential surface provided with a plurality of first gear teeth, and a first band member surrounding the first gear member and pressing the plurality of first gear teeth inwardly. According to this aspect, the first band member surrounds the first gear member to press the plurality of first gear teeth inwardly. Thus, it is possible to maintain a degree of rigidity of the first gear member and to reduce gear noise.

In a specific example (fifth aspect) of the fourth aspect, the first band member is disposed on a portion of the first gear member that extends in a direction along a rotation axis and that does not overlap the second gear structure. According to this aspect, the first band member does not interfere with the second gear structure. Thus, gear noise can be reduced in a state in which the first band member does not affect rotation of the second gear structure.

In a specific example (sixth aspect) of the fourth aspect or the fifth aspect, the second gear structure includes a second gear member including an outer circumferential surface provided with a plurality of second gear teeth; and a second band member surrounding the second gear member and pressing the plurality of second gear teeth inwardly. According to this aspect, the first band member surrounding the first gear member is provided, and the second band member surrounding the second gear member is provided. Thus, compared to a configuration in which the second band member is not provided, the effect is particularly significant in that gear noise is reduced.

In a specific example (seventh aspect) of the sixth aspect, the second band member is disposed on a portion of the second gear member that extends in a direction along a rotation axis and that does not overlap the first gear structure. According to this aspect, the second band member does not interfere with the first gear structure. Thus, gear noise can be reduced in a state in which the second band member does not affect rotation of the first gear structure.

DESCRIPTION OF REFERENCE SIGNS 10, 10a, 10b . . . gear structure, 12 . . . shaft member, 20, 20a, 20b . . . gear member, 21 . . . outer circumferential surface, 22, 22a, 22b ... gear tooth, 23 ... tip surface, 24, 24a, 24b ... mounting groove, 25, 25a, 25b ... side surface, 26, 26a, 26b ... side surface, 30, 30a, 30b ... band member, 100 ... gear mechanism.

What is claimed is:

1. A gear structure comprising:
 a gear member including an outer circumferential surface provided with a plurality of gear teeth; and
 a band member surrounding the gear member and pressing the plurality of gear teeth inwardly,
 wherein the band member includes an inner circumferential surface that contacts the plurality of gear teeth that includes a plurality of recesses that are configured for receipt of the plurality of teeth.

2. The gear structure according to claim 1,
 wherein each of the plurality of gear teeth includes a tip surface provided with a mounting groove, and
 wherein the band member fits in the mounting groove provided in each of the plurality of gear teeth.

3. The gear structure according to claim 1, wherein the band member is an annular elastic body.

4. A gear mechanism comprising:
 a first gear structure; and
 a second gear structure that meshes with the first gear structure,
 wherein the first gear structure includes:
  a first gear member including an outer circumferential surface provided with a plurality of first gear teeth, and
  a first band member contacting the first gear member and pressing the plurality of first gear teeth inwardly; and
 wherein the second gear structure includes:
  a second gear member including an outer circumferential surface provided with a plurality of second gear teeth, and
  a second band member contacting the second gear member and pressing the plurality of second gear teeth inwardly.

5. The gear mechanism according to claim 4, wherein the first band member is disposed on a portion of the first gear member that extends in a direction along a rotation axis and that does not overlap the second gear structure.

6. The gear mechanism according to claim 4, wherein the second band member is disposed on a portion of the second gear member that extends in a direction along a rotation axis and that does not overlap the first gear structure.

* * * * *